(12) United States Patent
Vaisband

(10) Patent No.: US 12,470,523 B1
(45) Date of Patent: Nov. 11, 2025

(54) SYSTEMS, AND METHODS FOR SECURE REMOTE MULTI-USER LAN ACCESS

(71) Applicants: MOBULUSNET LTD., Yokneam Ilit (IL); THE IP LAW FIRM OF GUY LEVI, LLC, Wyckoff, NJ (US)

(72) Inventor: Oleg Vaisband, Nesher (IL)

(73) Assignee: MobulusNet LTD., Yokneam Ilit (IL)

( * ) Notice: Subject to any disclaimer, the term of this patent is extended or adjusted under 35 U.S.C. 154(b) by 0 days.

(21) Appl. No.: 18/847,163

(22) PCT Filed: Mar. 11, 2023

(86) PCT No.: PCT/US2023/015040
§ 371 (c)(1),
(2) Date: Sep. 13, 2024

(87) PCT Pub. No.: WO2023/172764
PCT Pub. Date: Sep. 14, 2023

Related U.S. Application Data

(60) Provisional application No. 63/318,884, filed on Mar. 11, 2022.

(51) Int. Cl.
*G06F 7/04* (2006.01)
*H04L 9/40* (2022.01)

(52) U.S. Cl.
CPC ...... *H04L 63/0272* (2013.01); *H04L 63/0442* (2013.01); *H04L 63/0876* (2013.01)

(58) Field of Classification Search
CPC ....... H04L 63/061; H04L 9/08; H04L 9/0825; H04L 63/0435; H04L 63/0272; H04L 63/0442; H04L 63/0876; G06F 21/335
See application file for complete search history.

(56) References Cited

U.S. PATENT DOCUMENTS

| | | | |
|---|---|---|---|
| 9,906,992 B1 * | 2/2018 | Youtz | H04W 36/0033 |
| 2006/0123465 A1 | 6/2006 | Ziegler | |
| 2006/0126587 A1 * | 6/2006 | Tsubota | H04L 45/54 370/352 |
| 2006/0174336 A1 * | 8/2006 | Chen | H04L 63/104 726/11 |
| 2009/0313691 A1 | 12/2009 | Chien | |
| 2014/0334471 A1 | 11/2014 | Chen | |

(Continued)

OTHER PUBLICATIONS

Raghavan et al, Virtual Private Networks and their Role in E-Business, Jan. 1, 2002, IEEE, pp. 99-115. (Year: 2002).*

(Continued)

*Primary Examiner* — Philip J Chea
*Assistant Examiner* — Jenise E Jackson
(74) *Attorney, Agent, or Firm* — Guy Levi; The IP Law Firm of Guy Levi, LLC

(57) ABSTRACT

The disclosure relates to systems, methods and computer readable media for enabling distributed secure remote access from a device via a wide area network (WAN), to a designated physical site covered by local area network (LAN). Specifically, the disclosure relates to a computerized systems, methods and computer-readable media using hardware-based, virtual private network pairs having preshared encryption/decryption keys, operable to transmit data over WAN from a physical computing device to an exclusively designated site in a physical area covered by a LAN.

36 Claims, 5 Drawing Sheets

(56) References Cited

U.S. PATENT DOCUMENTS

2016/0285831 A1   9/2016  Doane et al.
2019/0327112 A1   10/2019 Nandoori et al.

OTHER PUBLICATIONS

Kagan, Virtual Private Networks—New Strategies for Secure Enterprise Networking, Sep. 17, 1998, IEEE, pp. 267-272. (Year: 1998).*

* cited by examiner

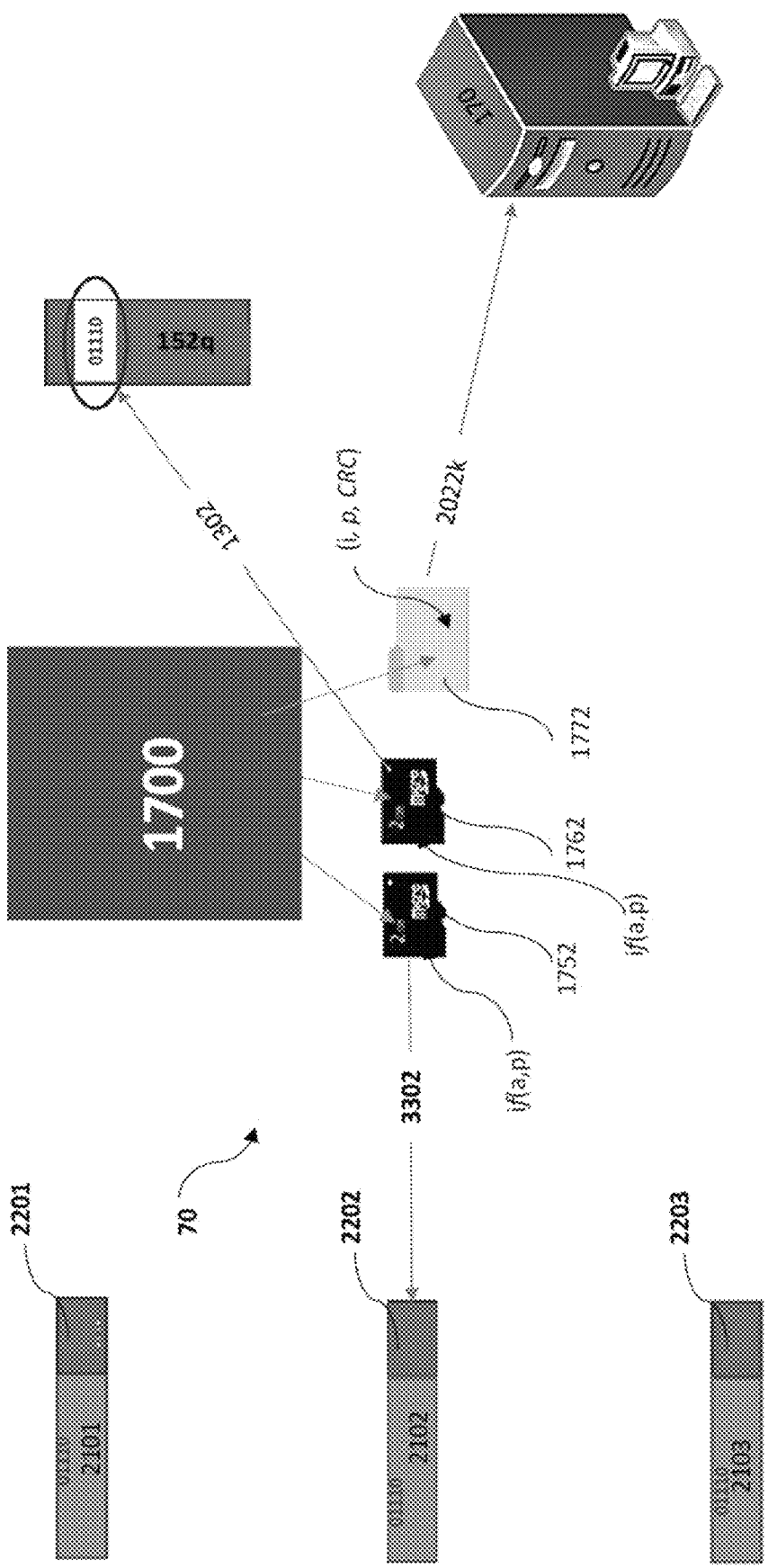

SYSTEMS, AND METHODS FOR SECURE REMOTE MULTI-USER LAN ACCESS

CROSS REFERENCE TO RELATED APPLICATIONS

This patent application is a U.S. National Phase filing of commonly owned and pending PCT Application No. PCT/US23/15040, filed Mar. 11, 2023, which is based on and claims the benefit of the filing date of U.S. Provisional Patent Application Ser. No. 63/318,884, filed Mar. 11, 2022, both which are incorporated herein by reference in their entirely.

COPYRIGHT NOTICE

A portion of the disclosure hereinbelow contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed generally, to systems, methods and computer readable media for enabling secure remote access from a device on a wide area network (WAN), to a designated physical site in a local area network (LAN). Specifically, the disclosure is directed to a computerized systems, methods and computer-readable media using hardware-based, virtual private network pairs having preshared encryption/decryption keys, operable to transmit data over WAN from a physical computing device to an exclusively designated site in a physical area covered by a LAN.

Communications networks connecting mobile devices, personal computers, servers, mainframes, sensors, such as those used by internet of things (IoT) and other networked devices, have become the accepted mode for communicating information between users. This can include anything from basic sharing of photos to the sophistication and security required by large financial and banking institutions. It is increasingly more evident that securing communications is just as important as getting the information to its intended recipient. There have been many attempts at securing information using various encryption schemes, encapsulating data in VPN tunnels, using third parties to authenticate the user, and many others.

In addition, recent events such as the SARS-Cov-2 Pandemic have drastically increased the need for giving employees the flexibility to work remotely several times a week, while maintaining a workstation in the organization's various locations. For security reasons, most organizations maintain a LAN covering the connected devices at the organization. Conversely, most communication from remote users (or for that matter, any connected physical computing device 205 (see e.g., FIG. 1)) is done through WAN (e.g., the internet).

These and other issues are addressed by the disclosed technology.

SUMMARY

Disclosed, in various exemplary implementations, are systems, methods and computer readable media for enabling secure remote access from a device on a wide area network (WAN), to a designated physical site in a local area network (LAN). Specifically, the exemplary implementations provide systems, methods and computer-readable media using hardware-based, virtual private network pairs having preshared encryption/decryption keys, operable to transmit data over WAN from a physical computing device 205 (see e.g., FIG. 1) to an exclusively designated site in a physical area covered by a LAN.

In an exemplary implementation provided herein is a networked system for secure communication of a plurality of remote users over wide area network, the system comprising: a plurality of remote access nodes, each remote access node comprising a network edge switch with a client transceiver hardware virtual private network (CHW VPN) module forming a first half of a paired HW VPN modules; a modular network switch operable to accommodate a plurality of enterprise transceiver HW VPN (EHW VPN) modules, each enterprise transceiver HW VPN module forming a second half of the paired HW VPN modules, wherein the modular network switch is in two-way communication with a wide-area network (WAN); a secure local area network (LAN) switch, in two-way communication with each of the enterprise transceiver HW VPN module; a key management server, in one-way communication with the enterprise transceiver HW VPN via a selector; and a user workstation, in two-way communication with the secure LAN switch via port isolation, the user workstation exclusively associated with the enterprise transceiver HW VPN module, wherein the secure LAN switch further comprises a LAN switch central processing module (CPM), with at least one processor in communication with a non-transitory memory device storing thereon processor-readable media with a set of executable instructions configured, when executed, to cause the at least one processor to: receive incoming encrypted data from the WAN; upon authentication of the at least one client transceiver HW VPN module, rout the incoming data to the enterprise transceiver HW VPN module (e.g., 151$q$, 152$q$, or 153$q$), paired with the authenticated client transceiver HW VPN module; using a current encryption/decryption preshared key (PSK) associated with the enterprise transceiver HW VPN module (e.g., 151$q$, 152$q$, or 153$q$), paired with the authenticated client transceiver HW VPN module, decrypt the incoming data; and, using port isolation, rout the decrypted data to the user workstation exclusively associated with the enterprise transceiver HW VPN module (e.g., 151$q$, 152$q$, or 153$q$), paired with the client transceiver HW VPN module.

In another exemplary implementation, provided herein is a computerized method of providing secure communication for a plurality of remote users over wide area network, implemented in a system comprising: a plurality of remote access nodes, each remote access node comprising a network edge switch with a client transceiver hardware virtual private network (CHW VPN) module forming a first half of a paired HW VPN modules; a modular network switch operable to accommodate a plurality of an enterprise HW VPN Modules, each enterprise transceiver HW VPN module forming a second half of the paired HW VPN modules, wherein the modular network switch is in communication with a wide-area network (WAN); a secure local area network (LAN) switch, in two-way communication with each of the enterprise transceiver HW VPN module (e.g., 151$q$, 152$q$, or 153$q$), paired with the client transceiver HW VPN module; a key management server, in one-way communication with each enterprise transceiver HW VPN via a hardware-based selector; and a user workstation, in two-way communication with the secure LAN switch, the user workstation exclusively associated with the enterprise transceiver HW VPN module (e.g., 151q, 152q, or 153q) via port isolation, paired with client transceiver HW VPN module (e.g., 2101, 2102, or 2103), wherein the secure LAN switch further comprises a LAN switch central processing module (sCPM), with at least one processor in communication with a non-transitory memory device storing thereon processor-readable media with a set of executable instructions configured, when executed, to control the at least one processor, the method comprising: receiving incoming encrypted data from the WAN; upon hardware authentication of the at least one of client transceiver HW VPN module (e.g., 2101, 2102, or 2103), routing the incoming data to the enterprise transceiver HW VPN module (e.g., 151q, 152q, or 153q), paired with the authenticated client transceiver HW VPN module; using a current encryption/decryption preshared key (PSK) associated with the enterprise transceiver HW VPN module (e.g., 151q, 152q, or 153q), paired with the authenticated client transceiver HW VPN module, decrypting the incoming data; and using port isolation, routing the decrypted data to the user workstation associated with the enterprise transceiver HW VPN module (e.g., 151q, 152q, or 153q), paired with the authenticated client transceiver HW VPN module.

In yet another exemplary implementation, provided herein is an article of manufacture comprising a computer-readable media with a set of executable instructions, operable, when executed, to cause at least one processor to receive incoming encrypted data from a WAN; upon hardware authentication of the at least one client transceiver HW VPN module, rout the incoming data to an enterprise transceiver HW VPN module coupled to the article of manufacture, which is paired with the authenticated client transceiver HW VPN module; using a current encryption/decryption preshared key (PSK) associated with the enterprise transceiver HW VPN module (e.g., 151q, 152q, or 153q), paired with the authenticated client transceiver HW VPN module, decrypt the incoming data; and using port isolation module included with the article of manufacture, rout the decrypted data to a user workstation exclusively associated with the enterprise transceiver HW VPN module (e.g., 151q, 152q, or 153q), paired with the client transceiver HW VPN module.

These and other features of the systems, methods and computer readable media enabling distributed secure remote access of multiple users from a physical device via WAN, to a designated physical site covered by LAN, will become apparent from the following detailed description when read in conjunction with the figures and examples, which are exemplary, not limiting.

BRIEF DESCRIPTION OF THE FIGURES

For a better understanding of the systems, methods and computer readable media for enabling distributed secure remote access of multiple users from a physical device via WAN, to a designated physical site covered by LAN, reference is made to the accompanying examples and figures, in which:

FIG. 5, is a schematic illustrating an exemplary implementation of updating preshared key (PSK) on the computing device's non-transitory memory device.

DETAILED DESCRIPTION

Figure 1:
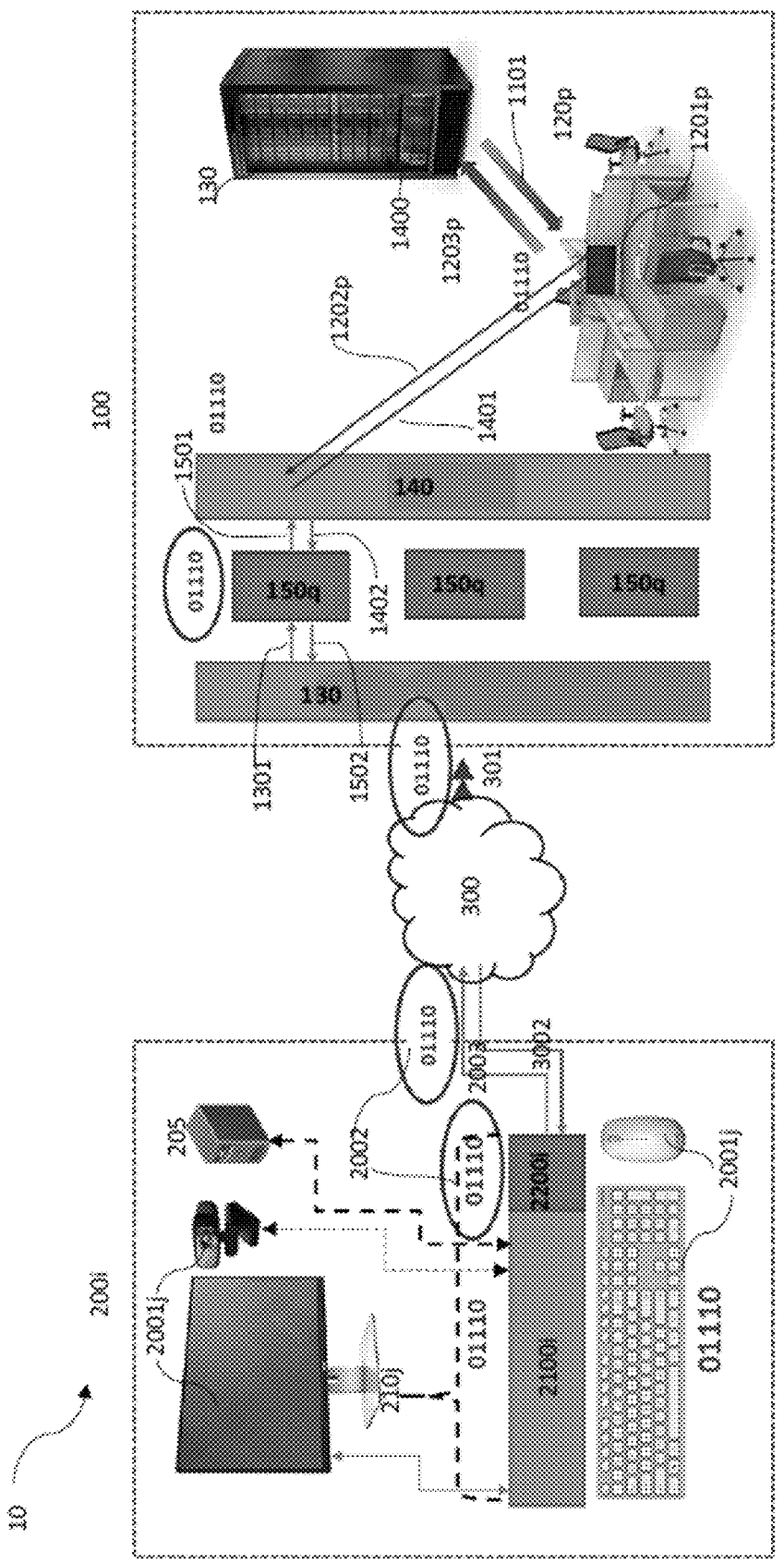
FIG. 1 is a schematic illustrating an exemplary implementation of the two directional data transfer using the HW-VPN pair from a single remote access node.

Provided herein are exemplary implementations of systems, methods and computer readable media for enabling distributed secure remote access from a device on a wide area network (WAN), to a designated physical site in a local area network (LAN). Specifically, provided herein are exemplary implementations of systems, methods and computer-readable media for using hardware-based, virtual private network pairs having encryption/decryption PSKs, operable to transmit data over WAN from a physical computing device 205 (see e.g., FIG. 1) to an exclusively designated site in a physical area covered by a LAN.

For example, sensitive data, carried remotely on a secure laptop can be transferred to a specifically designated workstation in a main office, or from another site of the organization. In other words, the systems, methods and computer-readable media (CRM) disclosed, provide a secured, distributed work space, with, inter-alia; point-to-point secure solution, integrated Secure cryptographic key management with key exchange, optional integrated modem, secure authentication of peripheral devices, secure management of camera, HW VPN traffic isolated for each user, user authentication, and customizable user presence with high degree of granularity.

Moreover, the disclosure provides for an intelligent Platforms, comprised of three discrete joined components: Wide area Network (WAN), Serial Key Management Server, and Local Area Network (LAN) with route isolator coupled to a workstation; The platform which will:

Provide secured access via WAN to wired (LAN) networks without the need for remote access applications and software Provide remote-users' identification and authorization in the network as well as provide access to corresponding Networking Applications and Resources according to the personal user profile pre-defined by network administrators.

Dramatically reduce investment into wiring infrastructure at the same time providing the fastest, secured and reliable access to the network.

Provide a consistent User's Policy across the network, which will guaranty access for the users from any place in the network to the Applications and Networking Resources defined in the User's Profile by network administrator.

Shield the enterprise from (spoofed) Address Resolution Protocol (ARP) attacks.

Therefore, and in an exemplary implementation, provided herein is a networked system for secure communication among a plurality of remote users over wide area network, the system comprising: a plurality of remote access nodes, each remote access node comprising a network edge switch with a client transceiver hardware virtual private network (HW VPN) module forming a first half of a paired HW VPN modules; a modular network switch operable to accommodate a plurality of an enterprise HW VPN Modules, each enterprise transceiver HW VPN module forming a second half of the paired HW VPN modules, wherein the modular network switch is in communication with a wide-area network (WAN); a secure local area network (LAN) switch, in two-way communication with each of the enterprise transceiver HW VPN module; a key management server, in one-way communication with each enterprise transceiver HW VPN via a hardware-based selector; and a user workstation, in two-way communication with the secure LAN switch, the user workstation associated with the enterprise transceiver HW VPN module, wherein the secure LAN switch further comprises a LAN switch central processing module (CPM), with at least one processor in communication with a non-transitory memory device storing thereon processor-readable media with a set of executable instructions configured, when executed, to cause the at least one processor to: receive incoming encrypted data from the WAN; upon authentication of the at least one client transceiver HW VPN module, rout the incoming data to the enterprise transceiver HW VPN module (e.g., 151$q$, 152$q$, or 153$q$), paired with the authenticated client transceiver HW VPN module; using a current encryption/decryption pre-shared key (PSK) associated with the enterprise transceiver HW VPN module (e.g., 151$q$, 152$q$, or 153$q$), paired with the authenticated client transceiver HW VPN module, decrypt the incoming data; and using port isolation, rout the decrypted data to the user workstation exclusively associated with the enterprise transceiver HW VPN module (e.g., 151$q$, 152$q$, or 153$q$), paired with the client transceiver HW VPN module.

The term "system" shall also be taken to include any collection of systems or sub-systems that individually or jointly execute a set, or multiple sets, of instructions to perform one or more functions. Also, the term "system" refers to a logical assembly arrangement of multiple devices, and is not restricted to an arrangement wherein all of the component devices are in the same housing, or physical location. Also, the term "server", in the context of the disclosure, refers to a computer system, including processing hardware and process space(s), and an associated storage system and database application (e.g., OODBMS or RDBMS) as is well known in the art. It should also be understood that "server system" and "server" are often used interchangeably herein. Similarly, the database object described herein (165) can be implemented as single databases, a distributed database, a collection of distributed databases, a database with redundant online or offline back-ups or other redundancies, etc., and might include a distributed database or storage network and associated processing intelligence such as, for example, machine learning algorithms.

Likewise, in the context of the disclosure, the term "remote access node" refers in an exemplary implementation to any device that is accessible via an IP network, such as for example a personal computer, laptop or notebook linked to the IP network via a fixed or wireless link or a PDA or a smart phone linked to the IP network via a wireless link (see e.g., FIGS. 1-5). Further the term also refers to any device, such as for example a mobile phone, or a sensor, able to be connected to a Mobile Communication Network. The term (terminal), may further include some or all the functionality of, a user equipment (UE), a wireless or wired communication device, a network device, a personal communication device, mobile device, and/or a mobile station. In an exemplary implementation, the remote network access node can be a hotspot, referring to a public access venue, location and/or geographical area in which a wireless access point (WAP) provides wireless network services (e.g. 802.11a/b/g/n based or supported services, WiMax based or supported services, cellular network based or supported services such as via CDMA, HSDPA, GPRS, etc., and other such services), to mobile visitors through a wireless local area network (WLAN), metropolitan area network (MAN), wide area network (WAN), or the like, using, for example but not limited to, Wi-Fi technology or the like.

Furthermore, the term "port isolation" means, in the context of the disclosure a port-to-port isolation of data routing. Typically, network communication ports are divided to two types, the physical port, referring to the interface used to connect the network cable on the switch, optical cables and routers; the other type is the logical port in the communication protocol. In certain exemplary implementations, port isolation technology configures the actual physical ports on the secure local area network (LAN) switch 140, to isolate user workstations 120$p$, so as to ensure that one workstation (1201$p$, 1202$p$, 1203$p$, 1204$p$) will not receive traffic from another, unassociated enterprise HW VPN (151$q$, 152$q$, 153$q$, etc.). By using this technology, the controlled ports are added to the isolation group, so as to realize the data isolation between the data link layer (2) and the network layer (3).

Figure 2:
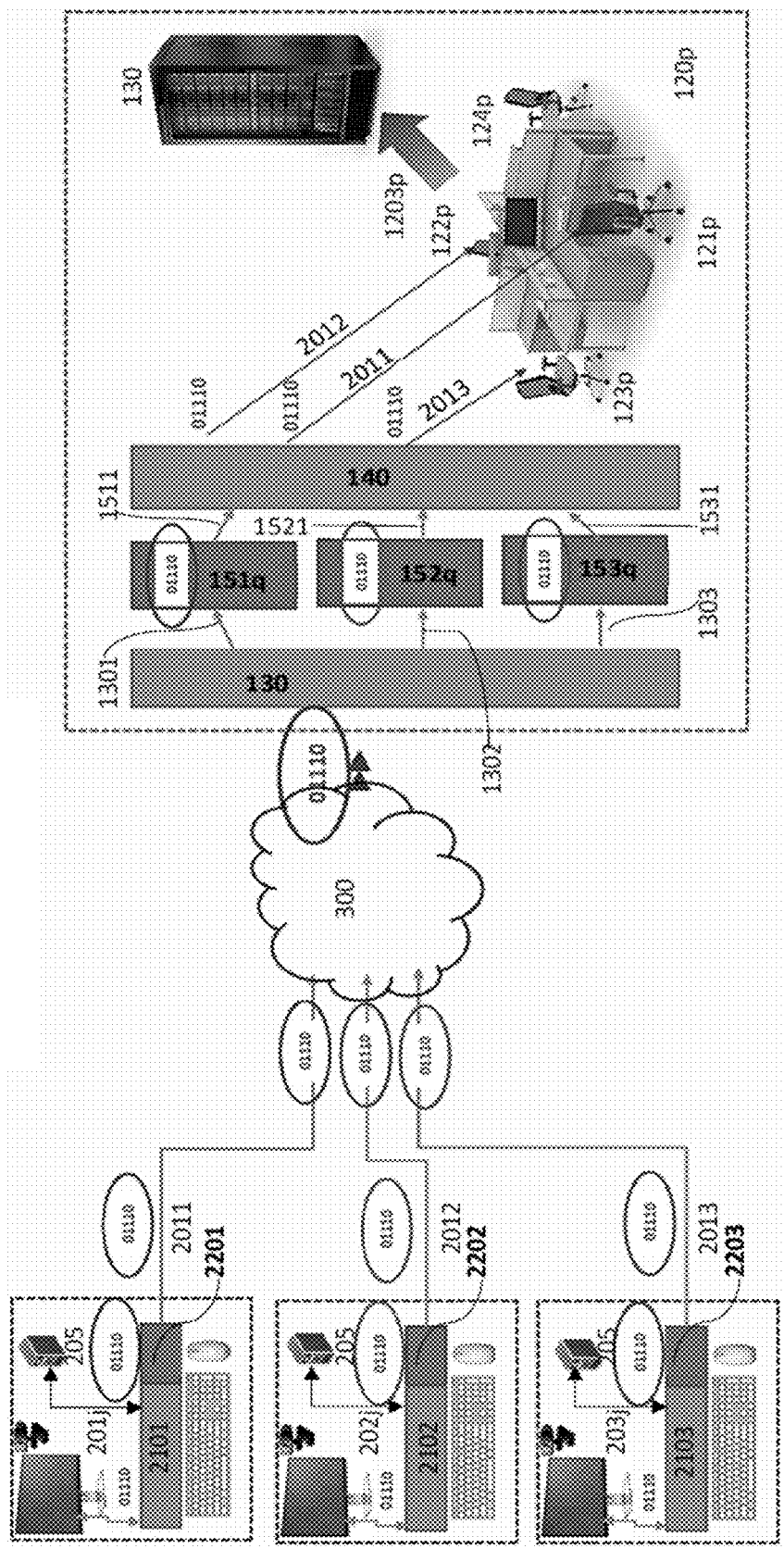
FIG. 2, is a schematic illustrating an exemplary implementation of the components of the system with multiple access nodes.
Figure 3:
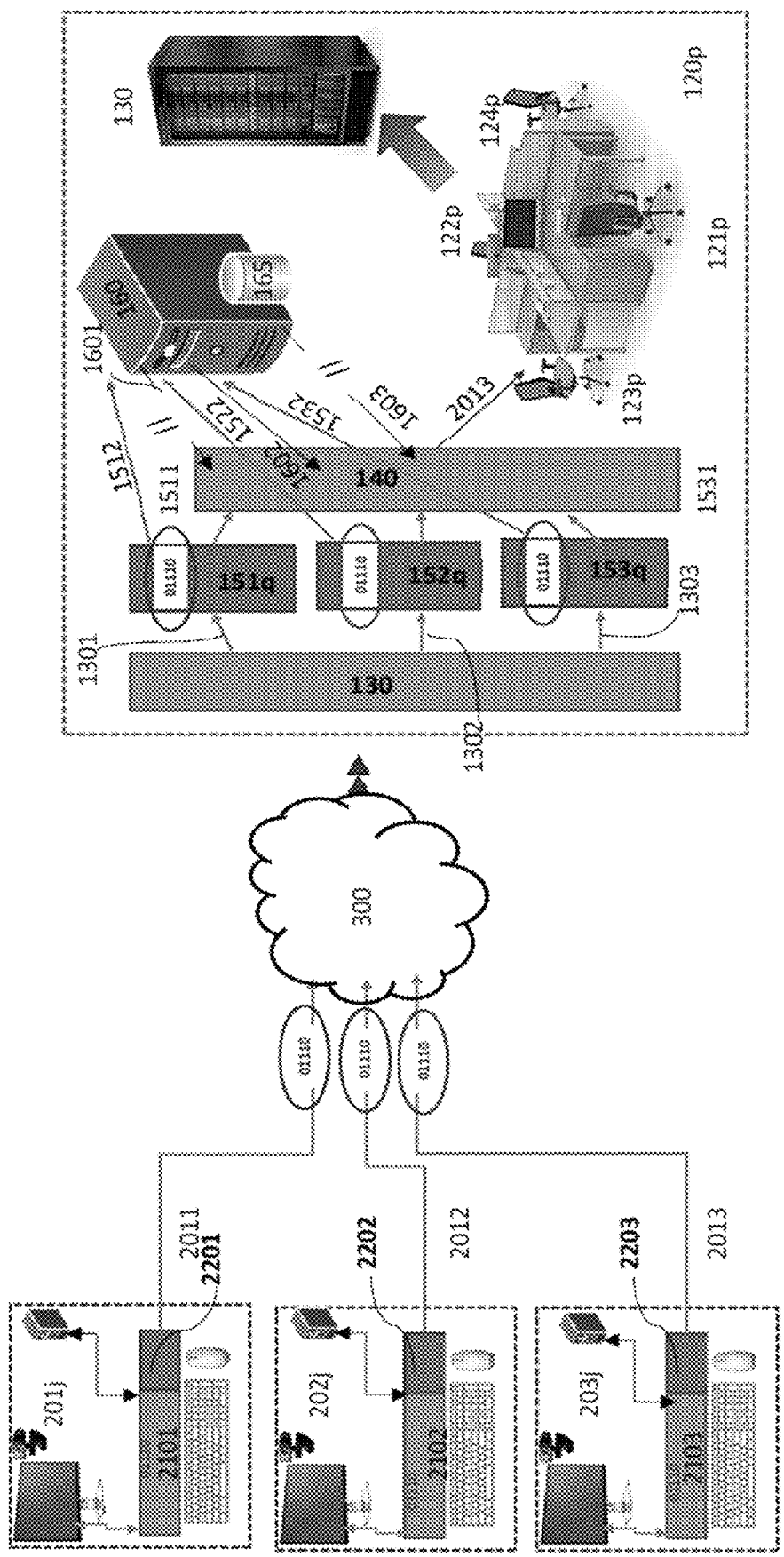
FIG. 3, is a schematic illustrating an exemplary implementation of the system components in the communication with the optional auxiliary authentication module comprising the authentication database.

In an exemplary implementation, and as illustrated in FIGS. 1-3, the systems disclosed comprise networked system 10 for distributed secure communication of a plurality of remote users over wide area network, the system comprising: a plurality of remote access nodes 200$i$, each remote access node comprising a router 2100$i$ having a client transceiver hardware virtual private network (CHW VPN) module 2200$i$ forming a first half of a HW VPN Pair, and together forming a network edge switch 210$j$; modular network switch 130 operable to accommodate a plurality of enterprise transceiver HW VPN (EHW VPN) modules 150$q$, each enterprise enterprise transceiver HW VPN module 150$q$ forming a second half of the HW VPN Pair 2200$i$-150$q$ (in other words, enterprise transceiver HW VPN module 150$q$ paired with client transceiver HW VPN module 2200$i$). As illustrated in FIGS. 2, and 3, HW VPN Pairs are formed in each remote access node of the network, as illustrated, the HW VPN pairs are 2201-151$q$; 2202-152$q$; and 2203-153$q$, etc, for additional pairs for remote access nodes 201$j$, 202$j$ and 203$j$ etc., respectively.

As illustrated, for example in FIG. 2, the system further comprises modular network switch 130 in two-way communication with wide-area network (WAN) 30, as well as secure local area network (LAN) switch 140, in two-way communication with each enterprise transceiver HW VPN half-Pair module (e.g., 151$q$-153$q$). Also shown, is optional auxiliary authentication module 160 (see e.g., FIG. 3), in two-way communication with each enterprise transceiver HW VPN module (e.g., 151$q$-153$q$). It is noted that there is a separation between the initial hardware-based authentication carried out at the network level (3), which takes place between the client transceiver HW VPN module and the enterprise transceiver HW VPN module. Authentication module 160 is used in certain exemplary implementation as an additional user authentication at the application layer. The hardware-based authentication can be, for example, crypto-based, crypto memory, trusted platform module (TPM, virtual and physical), and the like.

Figure 4:
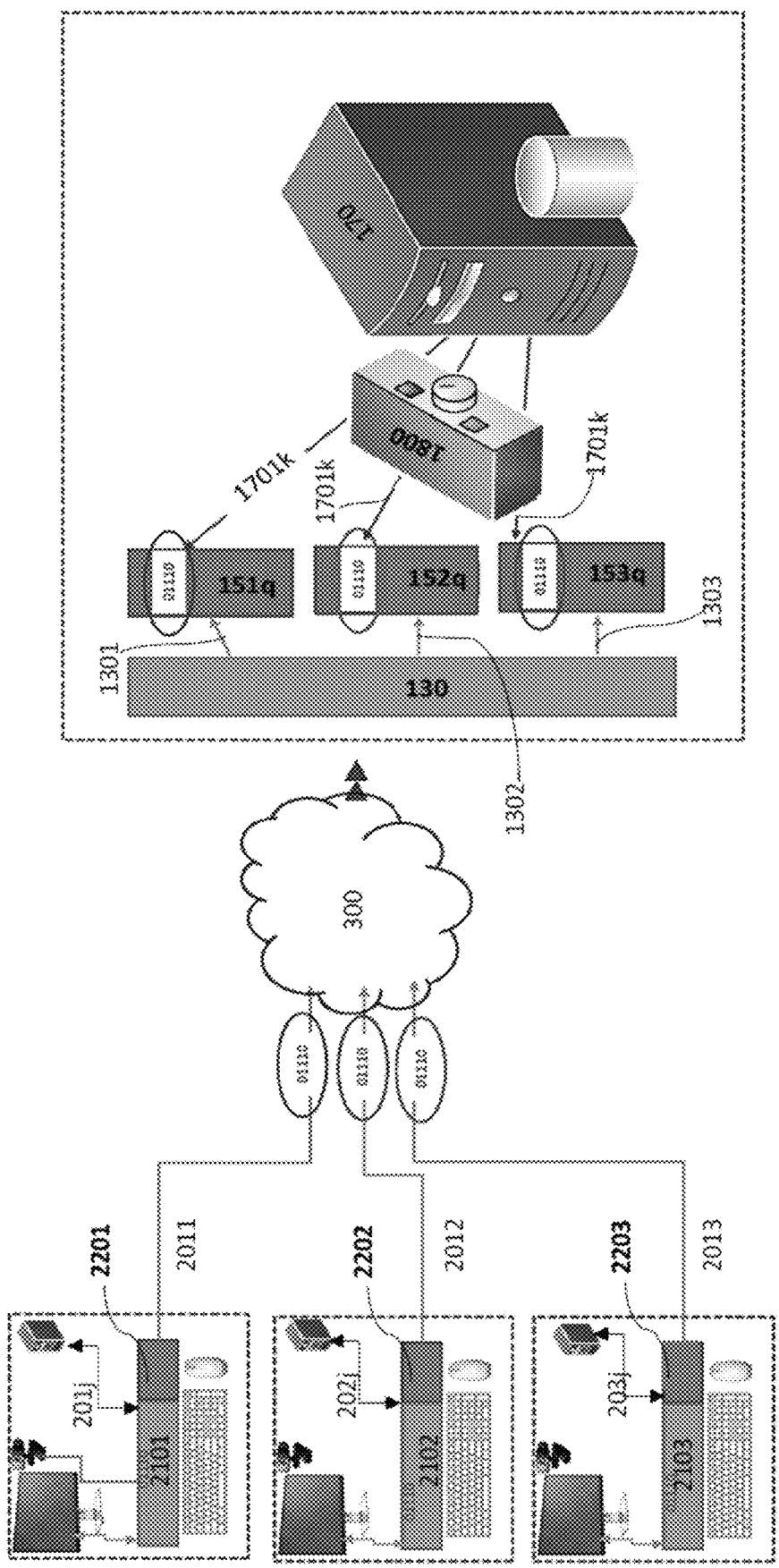
FIG. 4 is a schematic illustrating an exemplary implementation of the system components in the communication with the key generation and management module.

Key management server 170, illustrated in FIG. 4, is in one-way communication with each enterprise transceiver HW VPN module (e.g. 151$q$-153$q$), via selector 1800. In other words, key management server 170 can only communicate with a single pair at any given time. Also illustrated, are user workstation 120$p$, in two-way communication with each enterprise transceiver HW VPN module (e.g., 151$q$-153$q$) via port isolation such that only the associated enterprise transceiver HW VPN half-Pair module (e.g., 151q-153q) is in communication with user workstation 120p (e.g, enterprise transceiver HW VPN half-Pair module 151q has an isolated port configured to only communicate with user workstation 1201p and not any other user workstation). The user workstation is exclusively associated with a specific enterprise transceiver HW VPN half-Pair module (e.g., 151q-153q). In the context of the disclosure, the term "exclusively associated" and variations thereof mean "to make up exclusively the constituent parts of, to be the only components of, or to be the only members of", unless expressly specified otherwise. Thus, for example, the sentence "the red widget and the blue widget exclusively associated" means the red widget are connected only to the blue widget. However, while the red widget can only be connected to the blue widget, the black widget can be exclusively associated with the blue widget, and similarly, the white widget can be exclusively associated with the red widget.

As illustrated, workstation 121p is exclusively associated with transceiver HW VPN 151q, via port isolation protocol, which is exclusively associated with client transceiver HW VPN 2201i and data sent from network access node 201j, once client transceiver HW VPN 2201i is authenticated, can be routed only to workstation 121p, thus realizing data isolation between the data link layer (2) and the network layer (3). Likewise, any data generated in workstation 121p can only, and exclusively be routed to remote access node 201j. Secure LAN switch 140 further comprises a LAN switch central processing module (sCPM), 1300, with at least one processor in communication with a non-transitory memory device storing thereon processor-readable media with a set of executable instructions configured, when executed, to cause the at least one processor to: receive incoming encrypted data 301 from WAN 300, which was initiated by, for example network access node 201j using (optionally portable) network edge switch 210j, then using authentication module 160 (see e.g., FIG. 3), by sending authentication query 1512 with various parameters collected from network access node 201j, authenticate (1601, 1602, 1603) at least one of the client transceiver HW VPN half-pair module (e.g., at least one of client transceiver HW VPN half-pair module 2201, 2202, and 2203). Upon authentication, of the at least one of client transceiver HW VPN half-pair module (e.g., one of: 2201, 2202, and 2203), rout the incoming data (e.g., one of: 2011, 2012, 2013) to corresponding enterprise transceiver HW VPN module (e.g., one of: 151q, 152q, and 153q) paired with the at least one authenticated client transceiver HW VPN half-pair module (one of: 2201, 2202, and 2203), using a current encryption/decryption preshared key (PSK) associated with transceiver HW VPN module (e.g., one of: 151q, 152q, and 153q) paired with the authenticated client transceiver HW VPN module (e.g., one of: 2201, 2202, and 2203), decrypt the incoming data (e.g., one of: 151q, 152q, and 153q) decrypt the incoming data (e.g., one of: 1511, 1521, and 1531); and using port isolation, rout the decrypted data (e.g., one of: 2011, 2012, 2013) to user workstation (e.g., one of 121p, 122p, and 123p) associated with the authenticated client transceiver HW VPN pair (e.g., one of 2101-151q, 2102-152q, and 2103-153q).

In the context of the disclosure, the term "processor" can include, but is not necessarily being limited to, an instruction execution system such as a computer/processor based system, an Application Specific Integrated Circuit (ASIC), a computing device, or a hardware and/or software system that can fetch or obtain the logic from a non-transitory storage medium or a non-transitory computer-readable storage medium and execute the instructions contained therein. The processor can also include any controller, state-machine, microprocessor, or any other analogue, digital and/or mechanical implementation thereof. In addition, the computer program (software and/or firmware), can comprise program code means for carrying out the steps of the methods described herein, as well as a computer program product comprising program code means stored on a medium that can be read by a computer, such as a floppy disk, a hard disk, CD-ROM, DVD, USB memory stick, or a storage medium that can be accessed via a data network, and may contain secured data sought to be transferred.

Furthermore, the term "hardware VPN" (HW VPN) refers to a network switch operable to connect to a network through a dedicated, physical component, having its own processor, encryption/decryption capabilities, and firewall, configured to handle only its own functions, rather than running over a general-purpose device, thus making the HW VPN less vulnerable to attack (like ARP, Trojan virus and the like), while a dedicated processor, included with the HW VPN prevents it up overloading servers' CPU cycles, or adversely affecting the CPU of connected computing devices.

In certain exemplary implementations, the networking module having a client transceiver hardware virtual private network (HW VPN) module forming a first half of a HW VPN Pair are combined to form a Hardware VPN router or (optionally portable) network edge switch 210j. The (optionally portable) network edge switch 210j can be operable to further support and comprise at least one of: hardware-accelerated VPN (e.g., PPTP, L2TP/IPSec, or OpenVPN) client/server, a plurality of WAN/LAN ports, traffic load balancing and failover, at least one in-(LAN)-network GWN series WiFi Access Points (APs) (on the LAN side, and remote access node), and 7-layer network/application monitoring capability based on Deep Packet Inspection (DPI). Additionally, (optionally portable) network edge switch 210j (2100i+2200) is operable to support a plurality of peripherals 2001j, such as at least one of: a printer, a monitor, a camera, a file server, a database server, a backend management server, a sensor, an internet of things (IoT) device (e.g., pressure sensor, accelerometer, proximity sensor, etc), a mobile computing device (e.g., smartphone, laptop, tablet, phablet, and the like), and a stationary computing device (e.g., a desktop computer).

In an exemplary implementation, and as illustrated schematically in FIG. 5, key generation and management module 70 used in the systems disclosed and used to implement the methods provides is comprised of key management server 170. Key management server 170, can further store a plurality of files of indexed encoding/decoding algorithm (p) and an error detecting code (e.g., cyclic redundancy check, or CRC). As further illustrated, key generation and management module 70 further comprises air-gapped key generation server 1700 (in other words, a computing device that is physically segregated and incapable of connecting wirelessly or physically with other computers or network devices), which is operable to generate a plurality of, for example, SD Card pairs (see e.g., 1752, 1762) with each indexed file 1772 installed on key management server 170. In an exemplary implementation, a client SD Card 1752 (or any other physical memory device) comprising a $i^{th}$ plurality of encryption/decryption keys (if(a,p)) is physically installed on client transceiver HW VPN 2102i, while its paired SD Card 1762 (or any other physical memory device), comprising the same $i^{th}$ plurality of encryption/ decryption keys (i,f(a,p)) is physically installed on the paired enterprise transceiver HW VPN 152q.

Once the pair of physical memory storage devices are installed one in the client and one in the enterprise HW VPN pairs, a file comprising the index (i), the preshared key ('a, which can be for example 256 bit AES), decryption code (p) and an error detecting code (CRC) is physically uploaded to key management server 170, whereby key management server sends to enterprise transceiver HW VPN half pair (e.g., 151q, 152q, 153q,) the index of PSK to use, and using the CRC verify the proper PSK is implemented.

It is noted that in certain exemplary implementations, each encryption/decryption Key pair physical, non-transitory memory device is externally generated by Key generation server 1700, and physically preshared (in other words, installed with physical access—not uploaded through network), between each client/enterprise HW VPN pairs (e.g., one of 2101-151q, 2102-152q, and 2103-153q). Further, each encryption/decryption key pair can be physically added, removed, modified in Key management server 170, using, for example; serial out of band interface, secure digital (SD) card (see e.g., 2020, FIG. 5), memory card, smart card, near field communication (NFC), dedicated key pad, dedicated keyboard and the like. The plurality of preshared encryption/decryption key pairs, or a single encryption/decryption PSK pair can be stored inside each half HW VPN pair (e.g., one of 2101-151q, 2102-152q, and 2103-153q), or may be required to be removed 2022k, in response to a first event, such as one of: a predetermined number of authentications, an unsuccessful authentication, a detected change of location, and a first time lapse. Similarly, the whole plurality of encryption/decryption PSK pairs, may be required to be removed, in response to a second event, such as one of: occurrence of a predetermined number of the first event, a change of the user associated with the workstation, a second time lapse, and a power cycle.

Accordingly and in certain exemplary implementation, the set of executable instructions stored on the non-transitory memory device in communication with LAN switch 140 CPM, using Key management server 170 (e.g., a serial key management server), via hardware-based selector 1800, at a first predetermined event, is further configured, when executed to cause the at least one processor to: select a target HW VPN pair (e.g., one of 2101-151q, 2102-152q, and 2103-153q); command the target HW VPN pair (e.g., one of 2101-151q, 2102-152q, and 2103-153q) to switch the PSK to a predetermined index designator i; and receiving upon confirmation from the target HW VPN pair (e.g., one of 2101-151q, 2102-152q, and 2103-153q), execute the CRC to confirm the switch to the new PSK is complete.

An exemplary instruction set can include:
Key update/change process for Module set number Y.
Y2—Module on site (151q)
Y1—module at home (2201)
Initiator (key management server 170)
(HW-based) Selector Switch (1800) to Channel Y
New Key index i and p send to Module Y2
Y2 send (using existing tunnel with current a) i, p, crc to Y1'
Y1 gets a (using i, p) verify it and ack to Y2
Y1 and Y2 reestablish connection using new 'a and erase old 'a and 'p
Y2 ack to key management server 170
!70 disconnect 1800 from channel y
I—index,
a—AES PSK 256 bit plus additional data for CRC.
P—key used to encrypt a CRC—data used to evaluate that a decrypted correctly. does not compromise 256 bit of 'a'

Alternatively the set of executable instructions stored on the non-transitory memory device in communication with LAN switch 140 CPM, using Key management server 170, at the first predetermined event, can be configured, when executed to cause the at least one processor to perform the steps of: using Key management server 170, deleting the current encryption/decryption PSK, from the encryption/decryption PSK library stored on the physical non-transitory memory device coupled to the enterprise transceiver HW VPN module (e.g., 151q, 152q, or 153q), paired with client transceiver HW VPN module (e.g., 2101, 2102, or 2103); deleting the encryption/decryption PSK stored on the physical non-transitory memory device coupled to the (optionally portable) network edge switch 210j, comprising client transceiver HW VPN module (e.g., 2101, 2102, or 2103) and designating a new current encryption/decryption PSK from the encryption/decryption PSK library stored on the enterprise transceiver HW VPN module (e.g., 151q, 152q, or 153q), paired with client transceiver HW VPN module (e.g., 2101, 2102, or 2103); and (automatically) designating the encryption/decryption PSK paired with the new current encryption/decryption PSK designated from the encryption/decryption PSK library stored on (optionally portable) network edge switch 210j.

At a second predetermined event, the physical non-transitory memory device coupled to each of the client and enterprise transceivers HW VPN, is physically removed and replaced, and the file stored in the non-transitory memory device in communication with key management server 170, is deleted and a new set of physical non-transitory memory devices with a library of paired PSK are installed in each of the client and enterprise transceivers HW VPN pair (e.g., one of 2101-151q, 2102-152q, and 2103-153q).

In an exemplary implementation, the first predetermined event causing the removal of a single encryption/decryption PSK pair, is at least one of: a predetermined number of authentications, an unsuccessful authentication, a detected change of location, and a first time lapse; while the second predetermined event, causing in certain exemplary implementations, the removal of the entire library and sub-libraries of encryption/decryption PSK pairs, is at least one of: occurrence of at least one of: a predetermined number of the first event, a change of the user associated with the workstation, a second time lapse, and a power cycle event.

As further illustrated in FIGS. 1-4, (optionally portable) network edge switch 210j in each remote access node 200i further comprises a CPM in communication with a non-transitory memory device having thereon processor-readable media with a set of executable instructions configured, when executed, to cause the at least one processor to: receive data 2002 from physical computing device 205 (see e.g., FIG. 1); using the current encryption/decryption PSK stored on, and in use by (optionally portable) network edge switch 210j, comprising client transceiver HW VPN module (e.g., 2101, 2102, or 2103), encrypt the data; and using client transceiver HW VPN module (e.g., 2101, 2102, or 2103), transmit encrypted data 301 to WAN 300. Conversely, the set of executable instructions stored on the non-transitory memory device in communication with LAN switch 140 CPM 1400, is further configured, when executed to cause the at least one processor to: receive outgoing decrypted data 1202p from at least one user workstation (e.g., 122p. see e.g. FIG. 3); from the encryption/decryption PSK library stored on the enterprise transceiver HW VPN module (e.g., 151q, 152q, or 153q), exclusively associated with the at least one user workstation (e.g., 121p, 122p, 123p, or 124p, see e.g. FIG. 3), paired with client transceiver HW VPN module (e.g., 2101, 2102, or 2103), retrieve the current encryption/decryption PSK; encrypt outgoing data 1402; and using the enterprise transceiver HW VPN module (e.g., 151q, 152q, or 153q), paired with client transceiver HW VPN module (e.g., 2101, 2102, or 2103), transmit encrypted data 3002 through WAN 300 to the paired client transceiver HW VPN module (e.g., 2102, see e.g., FIG. 3).

At the other end, the set of executable instructions stored on the non-transitory memory device in communication with (optionally portable) network edge switch 210j CPM at remote access node 200i, is further configured, when executed, to cause the at least one processor to: receive incoming encrypted data 3002 (see e.g., FIG. 1) from WAN 300; then using the designated current encryption/decryption PSK, decrypt incoming data 3002; and using port isolation, rout the decrypted data to physical computing device 205.

In an exemplary implementation, authentication module 160 further comprise an authentication database 165, database 165 comprising a library of a plurality of dynamic user-specific parameters. Accordingly, authentication module 160 comprises an authentication processing control module (pCPM) in communication with a non-transitory memory device storing thereon processor-readable media with a set of executable instructions configured, when executed, to cause the at least one processor to: receive an authentication query (see e.g., FIG. 3, 1512, 1522, 1532), from secure LAN switch 140; whereupon using authentication database 165, obtain a plurality of parameters from client transceiver HW VPN module (e.g., 2101, 2102, or 2103); and compare the parameters obtained from client transceiver HW VPN module (e.g., 2101, 2102, or 2103) with the user-specific parameters in database 165, wherein: if the obtained parameters match or exceed a predetermined level of correspondence to the user-specific parameters in database 165, authenticate (see e.g., FIG. 1, 1602) client transceiver HW VPN module (e.g., 2102); then allow receipt of encrypted data 1302 from client transceiver HW VPN module 2102 by HW VPN module 152q paired with authenticated client transceiver HW VPN module 2102; else block receipt of encrypted data 1301, 1303, from client transceiver HW VPN module 2101, 2103, by transceiver HW VPN module 151q, 153q respectively, paired with client transceiver HW VPN module 2101, 2103, respectively.

Furthermore, authentication module 160, can be configured to: based on temporospatial information about the users, and portable network edge switch 210j, provide secured access to the LAN, for example, based on the User's Physical Location, specific time schedules, membership in workgroups, forums, meetings attendance and so on, identification and authorization in the network and limited by their temporospatial location relative to a network AP (or any network node for that matter). In other words, authentication involves the validation of the veracity of the user's identity prior to accepting data transmission to the enterprise transceiver HW VPN module (e.g., 151q, 152q, or 153q), paired with client transceiver HW VPN module (e.g., 2101, 2102, or 2103). Additionally, authorization, referring to the process of defining the action(s) authenticated devices are entitled to, based on, for example, one of: user biometric profile, device characteristics, including coupled peripherals, temporospatial location data (whether taken through routing information, or using GPS, and access profiles stored on database 165. When transmitting authentication query, access profiling can also depend on access provider, temporospatial location, or their combination. It will be appreciated that different combinations of the above processes may be implemented by authentication module 160, using different numbers of steps, or iterations, and having different levels of redundancy and/or parallel processing to provide a selected level of efficiency and/or accuracy.

In certain exemplary implementations, a user and (optionally portable) network edge switch 210j combination that are legitimate during regular work hours would nevertheless not be granted automatic access during off-schedule hours. For example, a doctor using his own tablet in a hospital during daylight hours when usually making rounds will be authenticated, but not automatically if he's using a smart phone in the hospital at night. Depending on the organization's definitions for policies, the user and device, if meeting the authentication threshold, will be authenticated and the device and hours of operation would be incorporated to the user-specific parameters associated with the user. Conversely, if determined not to meet the authentication threshold, authentication module 160 will block (see e.g., 1601, 1603, FIG. 3) the access of the data to the enterprise transceiver HW VPN module (e.g., 151q, 152q, or 153q), paired with client transceiver HW VPN module (e.g., 2101, 2102, or 2103).

In an exemplary implementation, using an auxiliary authentication module. the user/client (optionally portable) network edge switch 210j can define (and be defined by) different user-specific profiles (which can be stored on database 165) based on, at least one of: a virtual local area network (VLAN, referring to any network domain that is partitioned and isolated in a computer network at the data link layer (L2)), service set identifier (SSID), and the unique packet identifier attribute. That means, for example, that it is possible to define different portal profiles for wired and wireless networks. Or, per-SSID portal profile. The term "layer" as used herein, refers in an exemplary implementation, to a hierarchical protocol architecture in which a collection of conceptually similar functions provide services to a layer above it and receives service from a layer below it. In other words, the systems methods, and CRMs provided herein are configured to operate in networks where the access to the two sublayers, namely the Media Access Control (MAC) sublayer and the logical Link Control (LLC) sublayers are used by the authentication module 160 to control the moving of data in and out across a physical link in the network.

Thus, the system can be configured to authenticate users using several protocols/standards. This allows to integrate the systems and software stored on the non-transient computer readable medium described, in the organization's environment without necessarily requiring users associated with a physical location (workstation 120p), to remember yet another username and password. Supported authentication sources can be, for example: lightweight directory access protocol (LDAP), Microsoft Active Directory, Novell eDirectory, OpenLADP or any LDAP compliant server, Cisco ACS, RADIUS (FreeRADIUS, Radiator, etc.), Microsoft NPS, or any RADIUS-compliant server, Local user file (Apache htpasswd format), OAuth2, Facebook, Google, GitHub, LinkedIn, Microsoft Live, Twitter, security assertion markup language (SAML), or a combination comprising the foregoing authentication measures.

In certain exemplary implementations, the executable instructions stored on the non-transient processor-readable medium used in auxiliary authentication module 160 (included with the system in certain exemplary implementation), can further comprise a set of instructions that, when executed by at least one processor, causes the at least one processor to: based on the user identity, and the network session authentication, authorize or deny access to predetermined network nodes (e.g., (second) transceiver HW VPN module (e.g., 151*q*, 152*q*, or 153*q*), paired with client transceiver HW VPN module (e.g., 2101, 2102, or 2103)). The determination on how to allow or block the network data stream(s), in the authentication process can be based on at least one of: Source (optionally portable) network edge switch 210*j*, MAC addresses, protocol types, packet sizes, VLAN (802.1Q), or STP (Spanning Tree Protocol). Filtering (in other words, blocking or allowing access to (second) transceiver HW VPN module (e.g., 151*q*, 152*q*, or 153*q*), paired with client transceiver HW VPN module (e.g., 2101, 2102, or 2103), can be also based the OSI network layer mapping such as, for example, to the network layer's IPv4, IPv6, TCP/UDP/SCTP, ICMP, IGMP, ESP, AH, UDPLITE, 'ALL', TCP/UDP/SCTP over IPV6, ICMPv6.

Accordingly, the set of executable instructions stored on the non-transitory memory in communication with the authentication module's 160 pCPM, is further configured, when executed, to cause the at least one processor to: if the obtained parameters match or exceed the predetermined level of correspondence to the user-specific (e.g., user profile) parameters in database 160, yet do not correspond fully (in other words, no 100% homology), dynamically update the user-specific parameters in the authentication database. Furthermore, machine learning (ML), is used in certain exemplary implementations, to dynamically update the user-specific parameters in the authentication database. In other words, through access attempts, the authentication module can be configured to "learn" the user and her habits, and accordingly input data the Key management server 170, for decisions on the timing for removing a single encryption/decryption PSK, or the whole library.

In an exemplary implementation non-transitory memory device, interchangeable with the terms "non-transitory storage medium" and/or "non-transitory computer-readable storage medium" refers to, any media that can contain, store, or maintain programs, information, and data. Non-transitory storage medium and non-transitory computer-readable storage medium may include any one of many physical media such as, for example, electronic, magnetic, optical, electromagnetic, or semiconductor media. More specific examples of suitable non-transitory storage medium and non-transitory computer-readable storage medium include, but are not limited to, a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD). The memory device may comprise other types of memory as well, or combinations thereof. In addition, the memory medium may be located in a first computer in which the programs are executed, and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

In an exemplary implementation, the devices, systems, and CRM described herein are used to implement the methods described. Accordingly, provided herein is a computerized method of providing secure communication for a plurality of remote users over wide area network, implemented in a system comprising: a plurality of remote access nodes, each remote access node comprising a network edge switch with a client transceiver hardware virtual private network (HW VPN) module forming a first half of a paired HW VPN modules; a modular network switch operable to accommodate a plurality of an enterprise HW VPN Modules, each enterprise transceiver HW VPN module forming a second half of the paired HW VPN modules, wherein the modular network switch is in communication with a wide-area network (WAN); a secure local area network (LAN) switch, in two-way communication with each of the transceiver HW VPN module paired with the client transceiver HW VPN module; optionally an authentication module, in two-way communication with each enterprise transceiver HW VPN; a (non-optional) key management server, in one-way communication with each enterprise transceiver HW VPN via a hardware-based selector; and a (non-optional) user workstation, in two-way communication with the secure LAN switch, the user workstation exclusively associated with the transceiver HW VPN module paired with the client transceiver HW VPN module, wherein the secure LAN switch further comprises a LAN switch central processing module (sCPM), with at least one processor in communication with a non-transitory memory device storing thereon processor-readable media with a set of executable instructions configured, when executed, to control the at least one processor, the method comprising: receiving incoming encrypted data from the WAN; using hardware authentication, authenticating at least one of the client transceiver HW VPN module; upon authentication of the at least one of the client transceiver HW VPN module, routing the incoming data to the transceiver HW VPN module paired with the authenticated client transceiver HW VPN module; using a current encryption/decryption preshared key (PSK) associated with the transceiver HW VPN module paired with the authenticated client transceiver HW VPN module, decrypting the incoming data; and routing the decrypted data to the user workstation associated with the transceiver HW VPN module paired with the authenticated client transceiver HW VPN module. In other words, the systems disclose a secure three (3) networks configuration; WAN, LAN and optionally the auxiliary authentication network. The various edge network switches can be a part of an access control list (ACL) at various authentication levels, for example, at the network level, and/or the transport level, and/or the application level, as well as, if desired, at the MAC level.

Moreover, the methods disclosed, implemented using the systems disclosed and the programs described, further comprise: prior to the step of decrypting the incoming data: using the key generation and management module, generating a library of paired encryption/decryption keys; delivering a plurality of encryption/decryption keys to the portable edge network switch comprising the client transceiver HW VPN module, wherein the plurality of encryption/decryption keys are each the first half of the paired encryption/decryption keys, forming the encryption/decryption PSK library stored on the portable edge network switch; delivering a plurality of encryption/decryption keys to the transceiver HW VPN module paired with the client transceiver HW VPN module, wherein the plurality of encryption/decryption keys are each the second half of the paired encryption/decryption keys, forming the encryption/decryption PSK library stored on the transceiver HW VPN module paired with the client transceiver HW VPN module; from the encryption/decryption PSK library stored on the portable edge network switch, comprising the client transceiver HW VPN module, designating the current encryption/decryption PSK; and from the library stored on the transceiver HW VPN module paired with the client transceiver HW VPN module, designating the encryption/decryption PSK paired to the designated current encryption/decryption PSK of the associated portable edge network switch comprising the client transceiver HW VPN module.

The methods further comprise receiving data generated by the physical computing device; using the current encryption/decryption PSK, encrypting the generated data; and using the client transceiver HW VPN module, transmitting the encrypted data to the WAN. Also, using the key management server 170 at a first predetermined event, initiating substituting of the current encryption/decryption PSK thereby deleting the current encryption/decryption PSK, from the encryption/decryption PSK library stored on the physical non-transitory memory device coupled to the (optionally portable) network edge switch, comprising the client transceiver HW VPN module and deleting the encryption/decryption PSK paired with the current encryption/decryption PSK used by the client transceiver HW VPN module stored on the physical non-transitory memory device coupled to the enterprise transceiver HW VPN module paired with the client transceiver HW VPN module; designating a new current encryption/decryption PSK (i) from the encryption/decryption PSK library stored on the physical non-transitory memory device coupled to the (optionally portable) network edge switch, comprising the client transceiver HW VPN module; and designating the encryption/decryption PSK paired with the new current encryption/decryption PSK designated from the encryption/decryption PSK stored on the physical non-transitory memory device coupled to the (optionally portable) network edge switch, from the PSK stored on the physical non-transitory memory device coupled to the enterprise transceiver HW VPN module paired with the client transceiver HW VPN module.

Moreover, in certain exemplary implementation of the methods disclosed, the method further comprise the steps of: using the secure LAN switch, receiving outgoing decrypted data from at least one user workstation; using the current encryption/decryption PSK associated with the transceiver HW VPN module associated with the user workstation, which is paired with the client transceiver HW VPN module, encrypting the outgoing data; and using the transceiver HW VPN module paired with the client transceiver HW VPN module, transmitting the encrypted data through the WAN to the client transceiver HW VPN module. Then, at the remote access node's portable edge network switch, receiving incoming encrypted data from the WAN; using the current encryption/decryption key, decrypting the incoming data; and routing the decrypted data to the physical computing device.

In certain exemplary implementations, and as described hereinabove, the auxiliary authentication module further comprises an authentication processing control module (pCPM) in communication with a user-specific database (165) and a non-transitory memory device storing thereon processor-readable media with a set of executable instructions configured, when executed, to control at least one processor, whereby the method further comprises: receiving an authentication query from the secure LAN switch; using the authentication database, obtaining a plurality of parameters from the client transceiver HW VPN module; and comparing the parameters obtained from the client transceiver HW VPN module with the user-specific parameters in the database, wherein: if the obtained parameters match or exceed a predetermined level of correspondence to the user-specific parameters in the database, authenticating the client transceiver HW VPN module; then allowing receipt of the encrypted data from the client transceiver HW VPN module by the transceiver HW VPN module paired with the client transceiver HW VPN module; else blocking receipt of the encrypted data from the client transceiver HW VPN module by the transceiver HW VPN module paired with the client transceiver HW VPN module, and if the obtained parameters match or exceed the predetermined level of correspondence to the user-specific parameters in the database, yet do not correspond fully, dynamically updating the user-specific parameters in the authentication database.

In the context of the disclosure, the term "operable" means the system and/or the device and/or the program, or a certain element or step is fully functional, sized, adapted and calibrated, comprises elements for, and meets applicable operability requirements to perform a recited function when activated, coupled, implemented, actuated, effected, realized, or when an executable program is executed by at least one processor associated with the system and/or the module, and/or the device. In relation to systems and circuits, the term "operable" means the system and/or the circuit is fully functional and calibrated, comprises logic for, having the hardware firmware, and software necessary, as well as the circuitry for, and meets applicable operability requirements to perform a recited function when executed by at least one processor.

Additionally or alternatively, non-transitory memory device(s) may also comprise volatile memory. The term volatile memory may be used herein to refer to memory accessed by the processor in order to execute an operating system and/or one or more programs or executables on the device. Volatile memory may refer to and/or may be described as one or more of processor memory, program memory, dynamic memory, RAM, and/or the like. When volatile memory is used, the system can be configured to maintain the data stored thereon even when the Hardware VPN router (2100*i*+2200) switches the power off.

Further, the processor may be operably coupled to the various modules and components with appropriate circuitry. may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

The term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads). Likewise, "secure network switch" (see e.g., FIG. 1, 140), refers to a network device which receives data at multiple input ports and provides that data to an output port (e.g., capable of returning a value in an ARP table), for transmission over a communication link (e.g., LAN), and may also include computer networking devices such as a hub, router, bridge, gateway, multilayer switch and the like. In an exemplary implementation, the network switch is configured to support layer 3 switching/Routing.

Unless specifically stated otherwise, as apparent from the following discussions, it is appreciated that throughout the specification discussions utilizing terms such as "processing," "loading," "in communication," "transferring", "receiving", "sending", "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical and structural layers.

As may also be used herein, the terms "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). The processor, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, transient memory, non-transient memory, static memory, dynamic memory, flash memory, cache memory, and/or any device that stores digital information.

Note that if the processor, module, servers, network switches etc., processing circuit, and/or processing unit includes more than one processing device, the processing devices may be centrally located or may be distributed (e.g., cloud computing via indirect coupling via a local area network and/or a wide area network). Still further it is noted that, the memory element may store, and processor, module, processing circuit, and/or processing unit executes, hard coded and/or operational instructions corresponding to at least some of the steps and/or functions illustrated in one or more of FIGS. 1-4B elements. Such a memory device or memory element can be and is included in an exemplary implementation as an article of manufacture.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the transceiver(s) includes one or more transceiver).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

Reference throughout the specification to "one exemplary implementation", "another exemplary implementation", "an exemplary implementation", and so forth, when present, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

Accordingly and in an exemplary implementation, provided herein is a networked system for secure communication of a plurality of remote users over wide area network, the system comprising: a plurality of remote access nodes, each remote access node comprising a network edge switch with a client transceiver hardware virtual private network (HW VPN) module forming a first half of a paired HW VPN modules; a modular network switch operable to accommodate a plurality of an enterprise transceiver HW VPN Modules, each enterprise transceiver HW VPN module forming a second half of the paired HW VPN modules, wherein the modular network switch is in communication with a wide-area network (WAN); a secure local area network (LAN) switch, in two-way communication with each of the enterprise transceiver HW VPN module; a key management server, in one-way communication with each of the enterprise transceiver HW VPN Modules via a hardware-based selector; and a user workstation, in two-way communication with the secure LAN switch, the user workstation associated with the enterprise transceiver HW VPN module, wherein, the secure LAN switch further comprises a LAN switch central processing module (CPM), with at least one processor in communication with a non-transitory memory device storing thereon processor-readable media with a set of executable instructions configured, when executed, to cause the at least one processor to: receive incoming encrypted data from the WAN; upon a hardware authentication of the at least one client transceiver HW VPN module, rout the incoming data to the transceiver HW VPN module paired with the authenticated client transceiver HW VPN module; using a current encryption/decryption preshared key (PSK) associated with the transceiver HW VPN module paired with the authenticated client transceiver HW VPN module, decrypt the incoming data; and using port isolation, rout the decrypted data to the user workstation exclusively associated with the transceiver HW VPN module paired with the client transceiver HW VPN module, wherein (i) the edge network switch in each remote access node further comprises: a router, and wherein the edge network switch is operably coupled to a physical computing device, and optionally to at least one of: a monitor, a keyboard, a camera, a printer, and a mouse, wherein (ii) the key management server comprise a part of a key generation and management module comprising: an air-gapped key generation module; and the key management server, the networked system (iii) further comprising an auxiliary authentication module, wherein (iv) the key generation module is operable to provide a preshared key set comprised of a pair of matching physical non-transitory memory devices (in other words, a manufactured memory device storing the indexed key set), each storing thereon a plurality of indexed encryption/decryption keys, and a file comprising a matching indexed decryption key and an error checking code, wherein (v) each pair of HW VPN further comprises one-half of the pair of non-transitory memory devices, each storing thereon a plurality of indexed encryption/decryption keys, wherein (vi) the key management server comprises a CPM with at least one processor in communication with a non-transitory memory device storing thereon processor-readable media with a set of executable instructions configured, when executed, to cause the at least one processor to: using a hardware selector; select the client transceiver HW VPN and enterprise HW VPN pair; access the file comprising a matching indexed decryption key and an error checking code stored on a non-transitory memory device in communication with the CPM; designate an indexed encryption/decryption key; upon receiving confirmation of the indexed encryption/decryption key by the client transceiver HW VPN and enterprise HW VPN pair, using the error checking code, validating the selection; and using the hardware selector; deselecting the client transceiver HW VPN and enterprise HW VPN pair, wherein (vii) the portable edge network switch in each remote access node further comprises a CPM in communication with a non-transitory memory device having thereon processor-readable media with a set of executable instructions configured, when executed, to cause the at least one processor to: receive data from the physical computing device; using the current encryption/decryption PSK, encrypt the data; and using the client transceiver HW VPN module, transmit the encrypted data to the WAN, (viii) the set of executable instructions stored on the non-transitory memory device in communication with LAN switch CPM, using the key management server, at a first predetermined event, is further configured, when executed to cause the at least one processor to: using a hardware selector; select the client transceiver HW VPN and enterprise HW VPN pair; access the file comprising a matching indexed decryption key and an error checking code stored on a non-transitory memory device in communication with the CPM; designate a new indexed encryption/decryption key; upon receiving confirmation of the indexed encryption/decryption key by the client transceiver HW VPN and enterprise HW VPN pair, using the error checking code, validating the selection; deleting the old encryption/decryption key; and using the hardware selector; deselecting the client transceiver HW VPN and enterprise HW VPN pair, wherein (ix) the set of executable instructions stored on the non-transitory memory device in communication with LAN switch CPM, using the key management server, at a second predetermined event, is further configured, when executed to cause the at least one processor to: delete the file comprising a matching indexed decryption key and an error checking code wherein (x) the first predetermined event is at least one of: a predetermined number of hardware authentications, an unsuccessful hardware authentication, a detected change of location, and a first time lapse, (xi) the second predetermined event is at least one of: occurrence of at least one of: a predetermined number of the first event, a change of the user associated with the workstation, a second time lapse, and a power cycle event, wherein (xii) the set of executable instructions stored on the non-transitory memory device in communication with LAN switch CPM, is further configured, when executed to cause the at least one processor to: receive outgoing decrypted data from at least one user workstation; from the encryption/decryption PSK library stored on the physical non-transitory memory device coupled to the enterprise transceiver HW VPN module exclusively associated with the at least one user workstation via port isolation, paired with the client transceiver HW VPN module, retrieve the current encryption/decryption PSK; encrypt the outgoing data; and using the enterprise transceiver HW VPN module paired with the client transceiver HW VPN module, transmit the encrypted data through WAN to the paired client transceiver HW VPN module, wherein (xiii) the set of executable instructions stored on the non-transitory memory device in communication with the edge network switch CPM at the remote access node, is further configured, when executed, to cause the at least one processor to: receive incoming encrypted data from the WAN; using the designated current encryption/decryption PSK, stored on the physical non-transitory memory device coupled to the edge network switch, decrypt the incoming data; and route (in other words, direct, communicate, transmit, or channel) the decrypted data to the physical computing device, wherein (xiv) the auxiliary authentication module further comprises an authentication database, the database comprising a library of a plurality of dynamic user-specific parameters, wherein (xv) the auxiliary authentication module comprises an authentication processing control module (pCPM) in communication with a non-transitory memory device storing thereon processor-readable media with a set of executable instructions configured, when executed, to cause at least one processor to: receive an authentication query from the secure LAN switch; using the authentication database, obtain a plurality of parameters from the client transceiver HW VPN module; and compare the parameters obtained from the client transceiver HW VPN module with the user-specific parameters in the database, wherein: if the obtained parameters match or exceed a predetermined level of correspondence to the user-specific parameters in the database, authenticate the client transceiver HW VPN module; then allow receipt of the encrypted data from the client transceiver HW VPN module by the HW VPN module paired with the authenticated client transceiver HW VPN module; else block receipt of the encrypted data from the client transceiver HW VPN module by the transceiver HW VPN module paired with the client transceiver HW VPN module, (xvi) the user-specific parameters comprise: a user-specific workstation; a user-specific remote access node address; the transmitting HW VPN module associated with the user-specific remote access node address; and at least one of: a biometric parameter, a GPS location, a typical period of operation, a typical length of operation, an identifier of components coupled to the user-specific remote access node address, and a typical data-type transmitted, wherein (xvii) the set of executable instructions stored on the non-transitory memory in communication with the authentication pCPM, is further configured, when executed, to cause the at least one processor to: if the obtained parameters match or exceed the predetermined level of correspondence to the user-specific parameters in the database, yet do not correspond fully, dynamically update the user-specific parameters in the authentication database, and wherein (xviii) the networked system further comprising machine learning (ML) module to dynamically update the user-specific parameters in the authentication database.

In another exemplary implementation, provided herein is a computerized method of providing secure communication for a plurality of remote users over wide area network, implemented in a system comprising: a plurality of remote access nodes, each remote access node comprising a network edge switch with a client transceiver hardware virtual private network (HW VPN) module forming a first half of a paired HW VPN modules; a modular network switch operable to accommodate a plurality of an enterprise HW VPN Modules, each enterprise transceiver HW VPN module forming a second half of the paired HW VPN modules, wherein the modular network switch is in communication with a wide-area network (WAN); a secure local area network (LAN) switch, in two-way communication with each of the transceiver HW VPN module paired with the client transceiver HW VPN module; a key management server, in one-way communication with the secure LAN switch via a hardware selector; and a user workstation, in two-way communication with the secure LAN switch, the user workstation exclusively associated with the transceiver HW VPN module paired with the client transceiver HW VPN module via port isolation, wherein the secure LAN switch further comprises a LAN switch central processing module (sCPM), with at least one processor in communication with a non-transitory memory device storing thereon processor-readable media with a set of executable instructions configured, when executed, to control the at least one processor, the method comprising: receiving incoming encrypted data from the WAN; authenticating at least one of the client transceiver HW VPN module; upon a hardware authentication of the at least one of the client transceiver HW VPN module, routing the incoming data to the enterprise transceiver HW VPN module paired with the authenticated client transceiver HW VPN module; using a current encryption/decryption preshared key (PSK) associated with the enterprise transceiver HW VPN module paired with the authenticated client transceiver HW VPN module, decrypting the incoming data; and routing the decrypted data to the user workstation associated with the transceiver HW VPN module paired with the authenticated client transceiver HW VPN module, wherein (xix) the portable edge network switch in each remote access node is operably coupled to a physical computing device, and optionally to at least one of: a monitor, a keyboard, a camera, a printer, and a mouse, wherein (xx) the computerized method further comprises an air-gapped key generation module, operable to provide a preshared key set comprised of a pair of matching physical, non-transitory memory devices, each storing thereon a plurality of indexed encryption/decryption keys, and a file comprising a matching indexed decryption key and an error checking code, the method further comprising: coupling a first one half of the pair of matching physical, non-transitory memory devices, each storing thereon a plurality of indexed encryption/decryption keys to the client transceiver HW VPN; coupling a second one half of the pair of matching physical, non-transitory memory devices, each storing thereon a plurality of indexed encryption/decryption keys to the enterprise transceiver HW VPN; and uploading the file comprising a matching indexed decryption key and an error checking code to the key management server, the method further comprising (xxi) using the key management server and the hardware selector, selecting a pair of client transceiver HW VPN and enterprise transceiver HW VPN; designating one indexed encryption/decryption keys; and upon receiving input from the selected pair of client transceiver HW VPN and enterprise transceiver HW VPN the indexed encryption/decryption keys are implemented, using the error checking code, validating the selection of the indexed encryption/decryption keys as the current PSK, and (xxii) further comprising receiving data generated by the physical computing device; using the current encryption/decryption PSK, encrypting the generated data; and using the client transceiver HW VPN module, transmitting the encrypted data to the WAN, as well as (xxiii) further comprising using the key management server at a first predetermined event, deleting the current encryption/decryption PSK, from the encryption/decryption PSK stored on the physical non-transitory memory device coupled to the client transceiver HW VPN; and repeating the steps of claim 22, thereby designating a new encryption/decryption PSK, and also (xxiv) using the key management server at a first predetermined event, deleting the current encryption/decryption PSK, from the encryption/decryption PSK stored on the physical non-transitory memory device coupled to the enterprise transceiver HW VPN module paired with the client transceiver HW VPN module; deleting the current encryption/decryption PSK deleting the current encryption/decryption PSK, from the encryption/decryption PSK stored on the physical non-transitory memory device coupled to the client transceiver HW VPN, paired with the encryption/decryption PSK used by the enterprise transceiver HW VPN module; and repeating the previously relevant steps, thereby designating a new encryption/decryption PSK, the method further comprising (xxv) at a second predetermined event deleting the file comprising a matching indexed decryption key and an error checking code; removing the physical non-transitory memory device comprising the plurality of PSKs coupled to the enterprise transceiver HW VPN module paired with the client transceiver HW VPN module; removing the physical non-transitory memory device comprising the plurality of PSKs coupled to the client transceiver HW VPN module paired with the client transceiver HW VPN module and using the key generation module, repeat the relevant previous steps, (xxvi) the first predetermined event is at least one of: a predetermined number of authentications, an unsuccessful authentication, a detected change of location, and a first time lapse, (xxvii) the second predetermined event is at least one of: occurrence of a predetermined number of the first event, a change of the user associated with the workstation, and a second time lapse, whereby the method (xxviii) further comprising: using the secure LAN switch, receiving outgoing decrypted data from at least one user workstation; using the current encryption/decryption PSK associated with the enterprise transceiver HW VPN module associated with the user workstation, which is paired with the client transceiver HW VPN module, encrypting the outgoing data; and using the enterprise transceiver HW VPN module, transmitting the encrypted data through the WAN to the paired client transceiver HW VPN module, whereby (xxix) at the remote access node's portable edge network switch, receiving incoming encrypted data from the WAN; using the current encryption/decryption key, decrypting the incoming data; and routing the decrypted data to the physical computing device, the method (xxx) wherein the auxiliary authentication module further comprise an authentication database, the database comprising a library of a plurality of dynamic user-specific parameters, wherein (xxxi) the auxiliary authentication module further comprises an authentication processing control module (pCPM) in communication with a non-transitory memory device storing thereon processor-readable media with a set of executable instructions configured, when executed, to control at least one processor, the method further comprising: receiving an authentication query from the secure LAN switch; using the authentication database, obtaining a plurality of parameters from the client transceiver HW VPN module; and comparing the parameters obtained from the client transceiver HW VPN module with the user-specific parameters in the database, wherein: if the obtained parameters match or exceed a predetermined level of correspondence to the user-specific parameters in the database, authenticating the client transceiver HW VPN module; then allowing receipt of the encrypted data from the client transceiver HW VPN module by the transceiver HW VPN module paired with the client transceiver HW VPN module; else blocking receipt of the encrypted data from the client transceiver HW VPN module by the transceiver HW VPN module paired with the client transceiver HW VPN module, whereby (xxxii) the user-specific parameters comprise: a user-specific workstation; a user-specific remote access node address; the client transceiver HW VPN module associated with the user-specific remote access node address; and at least one of: a biometric parameter, a GPS location, a typical period of operation, a typical length of operation, an identifier of components coupled to the user-specific remote access node address, and a typical data-type transmitted, and (xxxiii) if the obtained parameters match or exceed the predetermined level of correspondence to the user-specific parameters in the database, yet do not correspond fully, dynamically updating the user-specific parameters in the authentication database, as well as (xxxiv) using machine learning (ML) module, dynamically updating the user-specific parameters in the authentication database.

Although the foregoing disclosure has been described in terms of some exemplary implementations, other exemplary implementations will be apparent to those of ordinary skill in the art from the disclosure herein. Moreover, the described exemplary implementations have been presented by way of example only, and are not intended to limit the scope of the inventions. Indeed, the novel methods, programs, devices and systems described herein may be embodied in a variety of other forms without departing from the spirit thereof. Accordingly, other combinations, omissions, substitutions and modifications will be apparent to the skilled artisan in view of the disclosure herein.

What is claimed:

1. A networked system for secure communication of a plurality of remote users over wide area network, the system comprising:
 a. a plurality of remote access nodes, each remote access node comprising a network edge switch with a client transceiver hardware virtual private network (HW VPN) module forming a first half of a paired HW VPN modules;
 b. a modular network switch operable to accommodate a plurality of an enterprise transceiver HW VPN Modules, each enterprise transceiver HW VPN module forming a second half of the paired HW VPN modules, wherein the modular network switch is in communication with a wide-area network (WAN);

c. a secure local area network (LAN) switch, in two-way communication with each of the enterprise transceiver HW VPN module;
d. a key management server, in one-way communication with each of the enterprise transceiver HW VPN Modules via a hardware-based selector; and
e. a user workstation, in two-way communication with the secure LAN switch, the user workstation associated with the enterprise transceiver HW VPN module, wherein, the secure LAN switch further comprises a LAN switch central processing module (CPM), with at least one processor in communication with a non-transitory memory device storing thereon processor-readable media with a set of executable instructions configured, when executed, to cause the at least one processor to:
  i. receive incoming encrypted data from the WAN;
  ii. upon a hardware authentication of the at least one client transceiver HW VPN module, rout the incoming data to the transceiver HW VPN module paired with the authenticated client transceiver HW VPN module;
  iii. using a current encryption/decryption preshared key (PSK) associated with the transceiver HW VPN module paired with the authenticated client transceiver HW VPN module, decrypt the incoming data; and
  iv. using port isolation, rout the decrypted data to the user workstation exclusively associated with the transceiver HW VPN module paired with the client transceiver HW VPN module.

2. The system of claim 1, wherein the edge network switch in each remote access node further comprises: a router, and wherein the edge network switch is operably coupled to a physical computing device, and optionally to at least one of: a monitor, a keyboard, a camera, a printer, and a mouse.

3. The system of claim 1, wherein the key management server comprise a part of a key generation and management module comprising: an air-gapped key generation module; and the key management server.

4. The system of claim 1, further comprising an auxiliary authentication module.

5. The system of claim 3, wherein the key generation module is operable to provide a preshared key set comprised of a pair of matching physical, non-transitory memory devices, each storing thereon a plurality of indexed encryption/decryption keys, and a file comprising a matching indexed decryption key and an error checking code.

6. The system of claim 5, wherein each pair of HW VPN further comprises one half of the pair of non-transitory memory devices, each storing thereon a plurality of indexed encryption/decryption keys.

7. The system of claim 3, wherein the key management server comprises a CPM with at least one processor in communication with a non-transitory memory device storing thereon processor-readable media with a set of executable instructions configured, when executed, to cause the at least one processor to:
  a. using a hardware selector; select the client transceiver HW VPN and enterprise HW VPN pair;
  b. access the file comprising a matching indexed decryption key and an error checking code stored on a non-transitory memory device in communication with the CPM;
  c. designate an indexed encryption/decryption key;
  d. upon receiving confirmation of the indexed encryption/decryption key by the client transceiver HW VPN and enterprise HW VPN pair, using the error checking code, validating the selection; and
  e. using the hardware selector; deselecting the client transceiver HW VPN and enterprise HW VPN pair.

8. The system of claim 2, wherein the portable edge network switch in each remote access node further comprises a CPM in communication with a non-transitory memory device having thereon processor-readable media with a set of executable instructions configured, when executed, to cause the at least one processor to:
  a. receive data from the physical computing device;
  b. using the current encryption/decryption PSK, encrypt the data; and
  c. using the client transceiver HW VPN module, transmit the encrypted data to the WAN.

9. The system of claim 8, wherein the set of executable instructions stored on the non-transitory memory device in communication with LAN switch CPM, using the key management server, at a first predetermined event, is further configured, when executed to cause the at least one processor to:
  a. using a hardware selector; select the client transceiver HW VPN and enterprise HW VPN pair;
  b. access the file comprising a matching indexed decryption key and an error checking code stored on a non-transitory memory device in communication with the CPM;
  c. designate a new indexed encryption/decryption key;
  d. upon receiving confirmation of the indexed encryption/decryption key by the client transceiver HW VPN and enterprise HW VPN pair, using the error checking code, validating the selection;
  e. deleting the old encryption/decryption key; and
  f. using the hardware selector; deselecting the client transceiver HW VPN and enterprise HW VPN pair.

10. The system of claim 9, wherein the set of executable instructions stored on the non-transitory memory device in communication with LAN switch CPM, using the key management server, at a second predetermined event, is further configured, when executed to cause the at least one processor to: delete the file comprising a matching indexed decryption key and an error checking code.

11. The system of claim 9, wherein the first predetermined event is at least one of: a predetermined number of hardware authentications, an unsuccessful hardware authentication, a detected change of location, and a first time lapse.

12. The system of claim 10, wherein the second predetermined event is at least one of: occurrence of at least one of: a predetermined number of the first event, a change of the user associated with the workstation, a second time lapse, and a power cycle event.

13. The system of claim 1, wherein the set of executable instructions stored on the non-transitory memory device in communication with LAN switch CPM, is further configured, when executed to cause the at least one processor to:
  a. receive outgoing decrypted data from at least one user workstation;
  b. from the encryption/decryption PSK library stored on the physical non-transitory memory device coupled to the enterprise transceiver HW VPN module exclusively associated with the at least one user workstation via port isolation, paired with the client transceiver HW VPN module, retrieve the current encryption/decryption PSK;
  c. encrypt the outgoing data; and
  d. using the enterprise transceiver HW VPN module paired with the client transceiver HW VPN module, transmit the encrypted data through WAN to the paired client transceiver HW VPN module.

14. The system of claim 13, wherein the set of executable instructions stored on the non-transitory memory device in communication with the edge network switch CPM at the remote access node, is further configured, when executed, to cause the at least one processor to:
   a. receive incoming encrypted data from the WAN;
   b. using the designated current encryption/decryption PSK, stored on the physical non-transitory memory device coupled to the edge network switch, decrypt the incoming data; and
   c. route the decrypted data to the physical computing device.

15. The system of claim 4, wherein the auxiliary authentication module further comprises an authentication database, the database comprising a library of a plurality of dynamic user-specific parameters.

16. The system of claim 15, wherein the auxiliary authentication module comprises an authentication processing control module (pCPM) in communication with a non-transitory memory device storing thereon processor-readable media with a set of executable instructions configured, when executed, to cause at least one processor to:
   a. receive an authentication query from the secure LAN switch;
   b. using the authentication database, obtain a plurality of parameters from the client transceiver HW VPN module; and
   c. compare the parameters obtained from the client transceiver HW VPN module with the user-specific parameters in the database, wherein:
      i. if the obtained parameters match or exceed a predetermined level of correspondence to the user-specific parameters in the database, authenticate the client transceiver HW VPN module; then
      ii. allow receipt of the encrypted data from the client transceiver HW VPN module by the HW VPN module paired with the authenticated client transceiver HW VPN module; else
      iii. block receipt of the encrypted data from the client transceiver HW VPN module by the transceiver HW VPN module paired with the client transceiver HW VPN module.

17. The system of claim 15, wherein the user-specific parameters comprise:
   a. a user-specific workstation;
   b. a user-specific remote access node address;
   c. the transmitting HW VPN module associated with the user-specific remote access node address; and
   d. at least one of: a biometric parameter, a GPS location, a typical period of operation, a typical length of operation, an identifier of components coupled to the user-specific remote access node address, and a typical data-type transmitted.

18. The system of claim 17, wherein the set of executable instructions stored on the non-transitory memory in communication with the authentication pCPM, is further configured, when executed, to cause the at least one processor to: if the obtained parameters match or exceed the predetermined level of correspondence to the user-specific parameters in the database, yet do not correspond fully, dynamically update the user-specific parameters in the authentication database.

19. The system of claim 18, further comprising machine learning (ML) module to dynamically update the user-specific parameters in the authentication database.

20. A computerized method of providing secure communication for a plurality of remote users over wide area network, implemented in a system comprising: a plurality of remote access nodes, each remote access node comprising a network edge switch with a client transceiver hardware virtual private network (HW VPN) module forming a first half of a paired HW VPN modules; a modular network switch operable to accommodate a plurality of an enterprise HW VPN Modules, each enterprise transceiver HW VPN module forming a second half of the paired HW VPN modules, wherein the modular network switch is in communication with a wide-area network (WAN); a secure local area network (LAN) switch, in two-way communication with each of the transceiver HW VPN module paired with the client transceiver HW VPN module; a key management server, in one-way communication with the secure LAN switch via a hardware selector; and a user workstation, in two-way communication with the secure LAN switch, the user workstation exclusively associated with the transceiver HW VPN module paired with the client transceiver HW VPN module via port isolation, wherein the secure LAN switch further comprises a LAN switch central processing module (sCPM), with at least one processor in communication with a non-transitory memory device storing thereon processor-readable media with a set of executable instructions configured, when executed, to control the at least one processor, the method comprising:
   a. receiving incoming encrypted data from the WAN;
   b. authenticating at least one of the client transceiver HW VPN module;
   c. upon a hardware authentication of the at least one of the client transceiver HW VPN module, routing the incoming data to the enterprise transceiver HW VPN module paired with the authenticated client transceiver HW VPN module;
   d. using a current encryption/decryption preshared key (PSK) associated with the enterprise transceiver HW VPN module paired with the authenticated client transceiver HW VPN module, decrypting the incoming data; and
   e. routing the decrypted data to the user workstation associated with the transceiver HW VPN module paired with the authenticated client transceiver HW VPN module.

21. The method of claim 16, wherein the portable edge network switch in each remote access node is operably coupled to a physical computing device, and optionally to at least one of: a monitor, a keyboard, a camera, a printer, and a mouse.

22. The method of claim 20, wherein the computerized method further comprises an air-gapped key generation module, operable to provide a preshared key set comprised of a pair of matching physical, non-transitory memory devices, each storing thereon a plurality of indexed encryption/decryption keys, and a file comprising a matching indexed decryption key and an error checking code, the method further comprising:
   a. coupling a first one half of the pair of matching physical, non-transitory memory devices, each storing thereon a plurality of indexed encryption/decryption keys to the client transceiver HW VPN;
   b. coupling a second one half of the pair of matching physical, non-transitory memory devices, each storing thereon a plurality of indexed encryption/decryption keys to the enterprise transceiver HW VPN; and c. uploading the file comprising a matching indexed decryption key and an error checking code to the key management server.

23. The method of claim 22, further comprising:
   a. using the key management server and the hardware selector, selecting a pair of client transceiver HW VPN and enterprise transceiver HW VPN;
   b. designating one indexed encryption/decryption keys; and
   c. upon receiving input from the selected pair of client transceiver HW VPN and enterprise transceiver HW VPN the indexed encryption/decryption keys are implemented, using the error checking code, validating the selection of the indexed encryption/decryption keys as the current PSK.

24. The method of claim 22, further comprising
   a. receiving data generated by the physical computing device;
   b. using the current encryption/decryption PSK, encrypting the generated data; and
   c. using the client transceiver HW VPN module, transmitting the encrypted data to the WAN.

25. The method of claim 23, further comprising
   a. using the key management server at a first predetermined event, deleting the current encryption/decryption PSK, from the encryption/decryption PSK stored on the physical non-transitory memory device coupled to the client transceiver HW VPN; and
   b. repeating the steps of claim 22, thereby designating a new encryption/decryption PSK.

26. The method of claim 23, further comprising:
   a. using the key management server at a first predetermined event, deleting the current encryption/decryption PSK, from the encryption/decryption PSK stored on the physical non-transitory memory device coupled to the enterprise transceiver HW VPN module paired with the client transceiver HW VPN module;
   b. deleting the current encryption/decryption PSK deleting the current encryption/decryption PSK, from the encryption/decryption PSK stored on the physical non-transitory memory device coupled to the client transceiver HW VPN, paired with the encryption/decryption PSK used by the enterprise transceiver HW VPN module; and
   c. repeating the steps of claim 23, thereby designating a new encryption/decryption PSK.

27. The method of claim 22, further comprising:
   a. at a second predetermined event deleting the file comprising a matching indexed decryption key and an error checking code;
   b. removing the physical non-transitory memory device comprising the plurality of PSKs coupled to the enterprise transceiver HW VPN module paired with the client transceiver HW VPN module;
   c. removing the physical non-transitory memory device comprising the plurality of PSKs coupled to the client transceiver HW VPN module paired with the client transceiver HW VPN module and
   d. using the key generation module, repeat the steps of claim 21.

28. The method of claim 25, or 26, wherein the first predetermined event is at least one of: a predetermined number of authentications, an unsuccessful authentication, a detected change of location, and a first time lapse.

29. The method of claim 27, wherein the second predetermined event is at least one of: occurrence of a predetermined number of the first event, a change of the user associated with the workstation, and a second time lapse.

30. The method of claim 22, further comprising:
   a. using the secure LAN switch, receiving outgoing decrypted data from at least one user workstation;
   b. using the current encryption/decryption PSK associated with the enterprise transceiver HW VPN module associated with the user workstation, which is paired with the client transceiver HW VPN module, encrypting the outgoing data; and
   c. using the enterprise transceiver HW VPN module, transmitting the encrypted data through the WAN to the paired client transceiver HW VPN module.

31. The method of claim 30, further comprising:
   a. at the remote access node's portable edge network switch, receiving incoming encrypted data from the WAN;
   b. using the current encryption/decryption key, decrypting the incoming data; and
   c. routing the decrypted data to the physical computing device.

32. The method of claim 20, wherein the auxiliary authentication module further comprise an authentication database, the database comprising a library of a plurality of dynamic user-specific parameters.

33. The method of claim 32, wherein the auxiliary authentication module further comprises an authentication processing control module (pCPM) in communication with a non-transitory memory device storing thereon processor-readable media with a set of executable instructions configured, when executed, to control at least one processor, the method further comprising:
   a. receiving an authentication query from the secure LAN switch;
   b. using the authentication database, obtaining a plurality of parameters from the client transceiver HW VPN module; and
   c. comparing the parameters obtained from the client transceiver HW VPN module with the user-specific parameters in the database, wherein:
      i. if the obtained parameters match or exceed a predetermined level of correspondence to the user-specific parameters in the database, authenticating the client transceiver HW VPN module; then
      ii. allowing receipt of the encrypted data from the client transceiver HW VPN module by the transceiver HW VPN module paired with the client transceiver HW VPN module; else
      iii. blocking receipt of the encrypted data from the client transceiver HW VPN module by the transceiver HW VPN module paired with the client transceiver HW VPN module.

34. The method of claim 33, wherein the user-specific parameters comprise:
   a. a user-specific workstation;
   b. a user-specific remote access node address;
   c. the client transceiver HW VPN module associated with the user-specific remote access node address; and
   d. at least one of: a biometric parameter, a GPS location, a typical period of operation, a typical length of operation, an identifier of components coupled to the user-specific remote access node address, and a typical data-type transmitted.

35. The method of claim 34, further comprising: if the obtained parameters match or exceed the predetermined level of correspondence to the user-specific parameters in the database, yet do not correspond fully, dynamically updating the user-specific parameters in the authentication database.

36. The method of claim 35, further comprising: using machine learning (ML) module, dynamically updating the user-specific parameters in the authentication database.

\* \* \* \* \*